May 28, 1957 W. W. MULTANEN 2,793,459

FISH LURES

Filed Dec. 19, 1955

WILLIAM W. MULTANEN
INVENTOR

HUEBNER, BEEHLER,
WORREL & HERZIG
ATTORNEYS

BY Richard M. Worrel

2,793,459

FISH LURES

William W. Multanen, Santa Cruz, Calif.

Application December 19, 1955, Serial No. 553,760

3 Claims. (Cl. 43—42.04)

The present invention relates to fish lures and more particularly to such lures adapted releasably to house a fish hook in concealed position therein and to expose the hook for fish catching purposes when the lure is pulled upon by a fish.

A problem in all fish lures has been the concealing of fish hooks employed therewith so as to avoid frightening the fish which it is desired to catch. This is normally attempted by the utilization of feathers or other devices intended to attract fish but which are frequently undesirably conspicuous, frightening to some types of fish, and otherwise objectionable.

Further, fish hooks have always constituted an inconvenient hazard when handling fish lures. Their barbed impaling ends are usually deliberately disposed for easy engagement so as to be effective for their intended fish catching purpose, and because of such disposition frequently snag the fisherman's hands, clothing and other objects near where the fishing operation is conducted.

The subject invention provides a fish lure which releasably houses a fish hook so as to avoid inadvertent engagement or entanglement therewith and so as to conceal the fish hook from the fish which it is desired to attract. However, when a pull is exerted on the lure, as by a fish attacking the lure, the hook is automatically drawn to exposed position for fish catching purposes. The lure also optionally provides a transparent housing for bait and the like so that the bait can be seen by fish while shielded from damage.

It is an object of the present invention to provide a fish lure having a releasably housed fish hook.

Another object is to minimize the inadvertent snagging and entanglement of the fish hooks of fish lures.

Another object is to provide a fish lure which is safer to handle than conventional lures having exposed fish hooks.

Another object is to provide a fish lure having a retracted fish hook housed and concealed therein which is automatically released for fish catching purposes by the application of a pulling force on the lure.

Another object is to provide a lure of the character described which is adapted to contain bait visible from externally of the lure.

Another object is to provide a fish lure adapted to contain bait visible from externally thereof, to shield the bait from damage, and yet to allow odor and/or flavor of the bait to escape.

Further objects and advantages will become apparent in the subsequent description in the specification.

Figure 2:
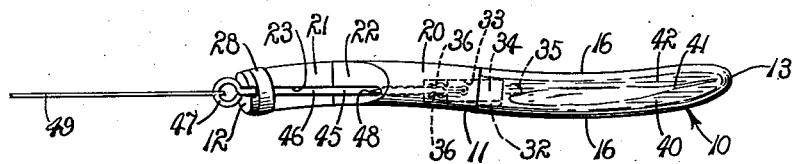
Fig. 2 is a top view of the fish lure and fish line of Fig. 1 with the hook in retracted position.
Figures 3, 4:
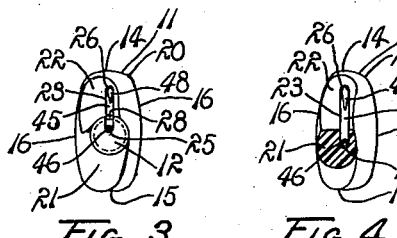
Fig. 3 is a transverse section taken on line 3—3 of Fig. 1.
Fig. 4 is a transverse section taken on line 4—4 of Fig. 1.
Figure 5:
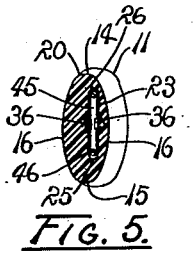
Fig. 5 is a transverse section taken on line 5—5 of Fig. 1.
Figure 6:
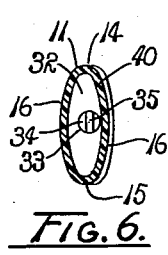
Fig. 6 is a transverse section taken on line 6—6 of Fig. 1.
Figure 7:
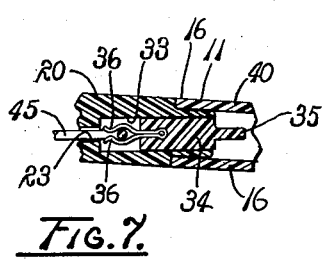
Fig. 7 is a somewhat enlarged fragmentary longitudinal section taken on line 7—7 of Fig. 1.

Referring more particularly to the drawing, a fish lure 10 incorporating the principles of the present invention includes an elongated, substantially flat, transversely oval-shaped body 11 of longitudinal sinusoidal curvature having a tapered front end 12 and a tapered rear end 13. The body also provides upper and lower edges 14 and 15 and opposite sides 16, as best seen in Fig. 2.

Figure 1:
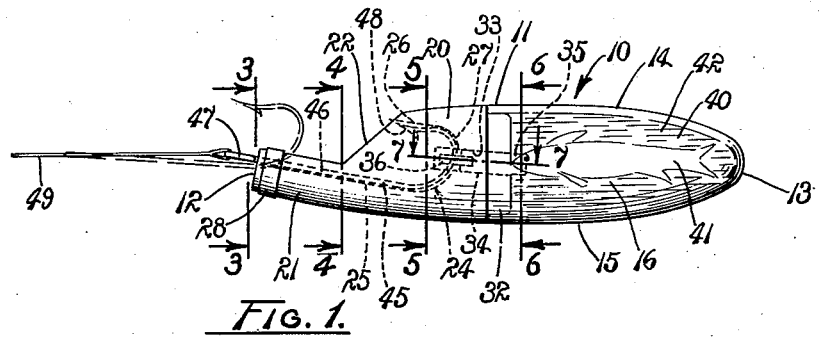
Fig. 1 is a side elevation of a fish lure constructed in accordance with the principles of the present invention including a fish hook attached to a fish line and showing the hook in phantom in an extended position and, with a portion shown in full lines in retracted position.

The body 11 includes a substantially opaque, preferably plastic, head portion 20 including a forwardly projected nose 21. The upper edge 14 of the body includes an outwardly beveled surface 22 extended rearwardly from the nose. The body has a longitudinal slit 23 extended rearwardly in the head portion of the body coextensive with the nose and opening upwardly of the body. The slit has an inner substantially U-shaped edge 24 providing a lower longitudinal segment 25, an upper longitudinal segment 26, and an arcuate segment 27 interconnecting the longitudinal segments. It is preferable that the inner edge of the slit be hook-shaped in contour, as shown in Fig. 1. An annular band or collar 28 is tightly secured in circumscribing relation to the front end of the nose 21 in bridging relation to the longitudinal segment 25 of the slit therein.

The head portion 20 of the body 11 provides a rearwardly disposed boss 32 and a substantially axially extended bore 33 extended from the slit 23 rearwardly through the boss. A mounting plug 34 is releasably frictionally fitted in the bore and has a manipulating knob 35 on a rearward end thereof projected outwardly of the head portion. A pair of resiliently flexible spring clips 36 are mounted in the plug in adjacent relation and forwardly extended therefrom within the bore at the rearward edge of the slit.

The body 11 of the fish lure 10 also provides a transparent, preferably plastic, tail portion 40 connected in fluid-tight relation to the head portion 20. For this purpose the tail portion may be releasably frictionally fitted on the boss 32. The tail portion is adapted to house bait, as 41, immersed in a quantity of water 42. This arrangement enables the keeping of bait in live condition for a substantial period of time thereby greatly enhancing its value as an attraction to the fish to be caught.

A fishhook 45 provides an elongated shank having an eyelet 47 and a sharpened impaling end 48. The fishhook is received in the slit 23 with the shank rested in the longitudinal segment 25 of the U-shaped edge 24 under the collar 28 and with the impaling end abutting the upper longitudinal segment 26 and arcuate segment 27, as best seen in Fig. 1. The eyelet of the hook is connected to a fishline leader 49 for slidably moving the hook from a position retracted within the head portion 20 of the body 11 and an exposed position outwardly extended from the body.

Second form

Figure 8:
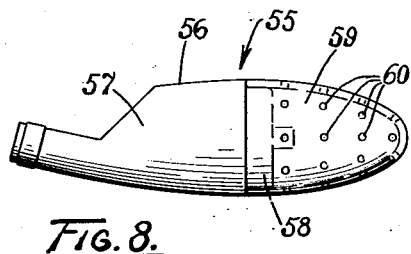
Fig. 8 is a side elevation of a further form of fish lure as provided by the present invention.

A second form of the present invention is shown in Fig. 8 and includes a fish lure 55 having an elongated body 56 providing a head portion 57 having a construction identical to the head portion 20 of the first form of the invention. For this reason no further description of the head portion 57 is believed necessary except to point out that a boss 58 is rearwardly extended from the head portion.

The second form of the invention provides a transparent hollow tail portion 59, preferably of plastic material, releasably frictionally fitted to the head portion 57 over the boss 58 and having a plurality of perforations 60 therein. The tail portion 59 is adapted to house bait, not shown, and the perforations are intended to permit the odor and tastes of the bait to escape outwardly of the tail portion.

Operation

The operation of the described embodiments of the present invention is believed to be readily apparent and is briefly summarized at this point. The fish lures 10 and 55 are prepared for use in the following manner. The hook 45 is connected to the fishline leader 49, and the impaling end 48 is inserted in the forward end of the slit 23 under the band 28 and slid around until the shank 46 is substantially aligned with the longitudinal segment 25 of the slit edge 24. The hook is then slid rearwardly into the head portion 20 of the body 11 until it is fully retracted therewithin. The hook is pushed rearwardly between the spring clips 36 so as to be releasably held therebetween. In this position the hook is dependably held by the spring clips and is concealed from view externally of the lure by reason of the opaque material of the head portion 20. It is to be noted at this point that the spring clips and plug 36 may be removed from the head portion for maintenance or replacement simply by twisting the knob 35 and sliding the plug rearwardly out of the head portion.

The tail portion 40, or 59, is then removed for the insertion of bait 41, as a minnow, therein. The tail portion 40 is filled with water so as to keep the bait alive for a period of time thereby to retain the bait in good condition. Bait is simply placed within the tail portion 59 and the tail portion attached to the head portion 57. The perforations, if the second form of lure is employed, permit the odor and taste of the bait to escape so as to attract fish. The first form of the invention appeals to the fish's sense of sight whereas the second form appeals to the senses of taste and odor as well as sight. The lure has proved excellently suited to the purpose even without the utilization of bait.

When used in fishing, the fish lure 10, or 55, is pulled through the water by the fishline 49. When it is pulled slowly, it wiggles like a fish and when it is pulled more rapidly, it acts like a spinner. These two effects are created by the curvature of the body 11 as described and shown in Fig. 2.

When a fish strikes at the lure 10, it is thereby pulled against the tension of the line 49 causing the hook 45 to be drawn from the spring clips 36 and to be drawn forwardly in the slit 23. As the hook moves outwardly, the shank 46 tips or pivots around the forward end of the nose 21, acting as a fulcrum, thereby to tip the impaling end 48 upwardly. The impaling end is thus brought more firmly and forcefully against the mouth of the fish to insure extension of the hook through the fish's mouth. The band 28 limits forward movement of the hook relative to the body 11 and prevents disassociation of the body from the hook.

It will be apparent from the foregoing that the fish lure of the present invention provides a convenient and safe housing for carrying a fish hook as well as being a highly effective means for concealing the hook while fishing. In addition, the invention obviates the need for baiting the hook inasmuch as it provides housing for the bait separately from the hook. In this latter regard, the invention provides two forms, both of which optionally utilize the bait in a highly effective manner as an attraction to fish.

Although the invention has been herein shown and described in what is conceived to be the most practical and preferred embodiments, it is recognized that departures may be made therefrom within the scope of the invention, which is not to be limited to the details disclosed herein but is to be accorded the full scope of the claims so as to embrace any and all equivalent devices and apparatus.

Having described my invention, what I claim as new and desire to obtain by Letters Patent is:

1. In a fish lure including a fish hook having a shank and an impaling end; an elongated, oval-shaped body being longitudinally of substantially sinusoidal curvature, having top and bottom longitudinal edges and a head portion of substantially opaque material providing a forwardly extended nose, the head providing a slit longitudinally thereof coextensive with the nose, the slit opening upwardly along the top edge of the body and providing a rearwardly downwardly inclined lower inner edge, the body further having a central bore extended from the slit rearwardly outwardly of the front portion of the body, the hook being slidably fitted in the slit with the shank forwardly extended from the nose for movement between a retracted position with the impaling end of the hook concealed within the body and an extended position with the impaling end upwardly and outwardly extended from the nose; an annular band secured in circumscribing relation to the nose, spanning said slit, and limiting extended movement of the hook relative to the body; a plug releasably frictionally fitted in the bore; and a pair of resilient spring clips mounted on the plug in adjacent spaced relation, forwardly extended therefrom into the slit, and being resiliently separable for releasable engagement with the hook when in retracted position; the body further having a hollow tail portion of transparent material releasably connected to the head portion for containing bait.

2. In a fish lure including a fish hook having a shank and an impaling end; an elongated, oval-shaped body being longitudinally of substantially sinusoidal curvature, having top and bottom longitudinal edges and a head portion of substantially opaque material providing a forwardly extended nose, the head having a slit longitudinally thereof coextensive with the nose, the slit opening upwardly along the top edge of the body and providing a lower inner edge, the body further having a passage extended from the slit rearwardly outwardly of the front portion of the body, the hook being slidably fitted in the slit with the shank forwardly extended from the nose for movement between a retracted position with the impaling end of the hook concealed within the body and an extended position with the impaling end outwardly extended from the nose; a band secured to the nose, spanning said slit, and limiting extended movement of the hook relative to the body; a pair of resilient clips; and means fitted in the passage mounting the clips thereon in adjacent spaced relation and forwardly extended into the slit, the clips being resiliently separable for releasable engagement with the hook when in retracted position, the body further having a hollow tail portion of transparent material releasably connected to the head portion for containing bait.

3. In a fish lure including a fish hook having a shank and an impaling end; an elongated, transversely thin, oval-shaped body being longitudinally of substantially sinusoidal curvature, having top and bottom longitudinal edges and a head portion of substantially opaque material providing a forwardly extended nose, the head having a slit longitudinally thereof coextensive with the nose, the slit opening along the top edge of the body and providing a lower inner edge, the body further having a passage extended from the slit rearwardly outwardly of the front portion of the body, the hook being slidably fitted in the slit with the shank forwardly extended from the nose for movement between a retracted position with the impaling end of the hook concealed within the body and an extended position with the impaling end outwardly extended from the nose; a band secured to the nose, spanning said slit, and limiting extended movement of the hook relative to the body; a plug releasably frictionally fitted in the passage; and resilient hook engaging means mounted on the plug, forwardly extended into the slit, and being resiliently engageable with the hook when in retracted position, the body further having a hollow tail portion of transparent material releasably connected to the head portion for containing bait, the tail and body portions being oppositely curved to provide the body with said sinusoidal curvature.

References Cited in the file of this patent

UNITED STATES PATENTS

| | | |
|---|---|---|
| 913,102 | Burke | Feb. 23, 1909 |
| 1,365,813 | Brown | Jan. 18, 1921 |
| 1,670,174 | Wiersma | May 15, 1928 |
| 2,205,773 | Fox | June 25, 1940 |
| 2,306,181 | Neumann | Dec. 22, 1942 |
| 2,309,521 | Mabee | Jan. 26, 1943 |
| 2,556,205 | McRoberts | June 12, 1951 |
| 2,614,356 | Kayes | Oct. 21, 1952 |
| 2,665,511 | Bradberry | Jan. 12, 1954 |